United States Patent [19]
Lundgren et al.

[11] 4,050,949
[45] Sept. 27, 1977

[54] REINFORCING MATERIAL FOR CONCRETE

[75] Inventors: Bengt G. S. Lundgren, Ulricehamn; Sture B. G. Ostling, Partille, both of Sweden

[73] Assignee: SKF Nova AB, Gothenburg, Sweden

[21] Appl. No.: 634,319

[22] Filed: Nov. 24, 1975

[30] Foreign Application Priority Data
Nov. 26, 1974 Sweden .................................. 7414809

[51] Int. Cl.² ...................... B22D 23/08; C04B 31/18
[52] U.S. Cl. ................................. 106/97; 75/.5 BA; 75/.5 C; 75/251; 106/99; 428/603; 428/606; 264/8
[58] Field of Search ................. 75/.5 B, .5 BA, .5 BB, 75/.5 C; 264/8; 106/99, 97; 52/659; 29/180 NM

[56] References Cited
U.S. PATENT DOCUMENTS

| 3,151,971 | 10/1964 | Clough | 75/.5 B |
|---|---|---|---|
| 3,429,094 | 2/1969 | Romualdi | 106/99 |
| 3,650,785 | 3/1972 | Ball et al. | 106/99 |
| 3,716,386 | 2/1973 | Kempster | 106/99 |
| 3,758,319 | 9/1973 | Ergene | 106/99 |

FOREIGN PATENT DOCUMENTS
2,127,563 12/1972 Germany .............................. 75/.5 B

*Primary Examiner*—W. Stallard
*Attorney, Agent, or Firm*—Daniel M. Rosen

[57] ABSTRACT

An improved reinforcing material for concrete and comprising a multitude of relatively short and substantially straight steel flakes. The steel flakes are of a shape tapering towards the ends of the flakes, and they have a thickness of about 0.1 mm to about 0.5 mm, a maximum width of at least about ten times the thickness, but at least about 2 mm, and a length of at least about 100 times the thickness. They are intended to be uniformly distributed and in principle randomly orientated in the concrete. The most preferred dimensions are: thickness 0.1 to 0.2 mm, maximum width 4 to 6 mm, and length 20 to 80 mm.

12 Claims, 8 Drawing Figures

REINFORCING MATERIAL FOR CONCRETE

BACKGROUND OF THE INVENTION

1. Field of the Invention

The present invention relates to a reinforcing material for concrete. The reinforcing material is of the type which incorporates a multitude of relatively short and substantially straight steel reinforcing elements with substantially rectangular cross section and small thickness in relation to their length and width. These reinforcing elements are intended to be uniformly distributed and in principle randomly orientated in the concrete.

In the present context "concrete" means primarily cement concrete, i.e. a hardened mixture of cement, sand and water, with or without additives such as stone materials, but also other types of concrete such as asphalt concrete. But in certain cases the term "concrete " is also used to define in a general way the unhardened mixture. Further, "steel" means a material with the element iron as its principle component, produced by a smelting process or other suitable method, e.g. by direct reduction, and with a carbon content of between 0% and about 2.0%, preferably not exceeding about 0.3%. It must always, however, be ensured that the reinforcing elements are not brittle and easily crushed, but possess a certain flexibility and ductility so that they stand being mixed with unhardened concrete without being crushed. As a rule, the hardness of the flakes should be at most about HRC (an equal sign) 50. Temperable steels may require dead-soft annealing to give the reinforcing elements the desired properties.

Description of the prior art

A reinforcngg material of said type is described in the British patent specification No. 303,406 and consists of elongated flat or ribbon-like strips or shreds of plate cut out of flattened tins and similar waste material. This reinforcing material seems however never to have found practical usage, probably due in part to a shortage of suitable raw material (i.e. empty tins and such like) and the high transportation and cleaning costs for the raw material. Due to the plate's susceptibility to corrugate when the tins are flattened and to differences in dimensions and materials between tins, it may also have been impossible to produce a homogeneous reinforcing material in which individual reinforcing elements had mutually identical properties and the same dimensions.

The use of thin metallic fibres of circular or rectangular cross section to reinforce synthetic resin materials is known. E.g. the U.S. Pat. Spec. No. 3,231,341 describes such fibres having a length of 0.05 to 50 mm and a "mean diameter" in cross section of 0.006 to 0.25 mm. For rectangular cross sections this "mean diameter" is half the sum of the short side and the long side of the rectangle. The fibres are suited for manufacture of metal fibre reinforced sealing members, bearings and similar small components. However, due to their small dimensions they as a rule are too expensive to be used in concrete.

A similar reinforcing material but for concrete is described in the U.S. Pat. Spec. Nos. 3,429,094 and 3,500,728, and consists of short and straight steel wires with smooth surfaces and circular cross sections, whose diameters can vary between about 0.15 and 0.60 mm, and whose lengths can vary between about 10 and 75 mm depending on the field of application. Compared to unreinforced concrete the wire-reinforced concrete exhibits greater flexural strength, compressive strength, impact resistance, abrasion resistance and spalling resistance. The wire-reinforced concrete also exhibits much greater resistance to crack formation and thermal shock, and the sections can be made considerably thinner for a given design strength, which results in material saving. Further, other types of reinforcement can be dispensed with and the labour cost to install reinforcement can be eliminated, and the wire-reinforced concrete requires less maintenance and has a longer service life.

Wire-reinforced concrete has been chiefly used in the construction of airfields and roads, pre-cast units, e.g. for the building industry, in situ or pre-cast tunnel linings, marine applications, etc., but employment on a large scale has been retarded by the cost of producing the thin short wires. The production of thin wire requires a long series of rolling and drawing operations and is consequently expensive. An example can be quoted in illustration; about six die reductions would be needed just to form round wire of a diameter of 0.254 mm to round wire of a diameter of 0.127 mm.

The use of wire-reinforcement in concrete is based on the theory of crack retardation in composite materials of the type "brittle material/ductile fibre", see e.g. The Journal of the Australian Institute of Metals, 16 (171):4, p 204–216 (W.J. McG. Tegart, Principles of Composites), and Metal Science Journal, 3, (1969), p 45–47 (S.D. Antolovich, Fracture Characteristics of a Brittle-Matrix/Ductile-Fibre Composite). When a crack occurs it is retarded by the fibres lying superficially. If the crack deepens, the fibres must accept the load and stretch elastically. If the stress on a fibre becomes too great, the fibre breaks and crack propagation proceeds. Alternatively the stress can exceed the adhesion between concrete and fibre, whereupon slippage starts, the fibre cannot be exploited and the process continues. In a mixture of concrete and randomly orientated steel fibres only a small proportion of the fibres are effective regarding crack retardation, namely those which are orientated parallel or nearly parallel to the direction of the tensile stress, since in this context a wire has only one effective direction, namely its longitudinal direction.

With regard to the stress distribution in a reinforcing element, when concrete reinforced by a large number of randomly orientated elements of this type is loaded, it can be confirmed that the maximum stress will occur in the middle of a reinforcing element orientated parallel to the direction of stress, whereas the element's ends are unstressed and thus ineffective from the reinforcement aspect. Since a wire as well as a strip or a fibre has a constant cross sectional area throughout its length, no one of them is in this respect an ideal reinforcing element. The volumetric content of reinforcing elements is utilized only to a fraction.

In order to achieve the overall reinforcing effect aimed at, bonding between concrete and reinforcing elements must be good. The loading is transferred from the concrete to a reinforcing element by shearing forces acting throughout the latter's length at the interface between element and concrete. If the reinforcing elements are short straight wires with circular cross sections and smooth surfaces, it is clearly difficult to achieve good bonding between the elements and the concrete. It has therefore been proposed, see U.S. Pat.

Spec. No. 3,592,727 to use wire which has a plurality of fairly long, flattened parts of substantially rectangular cross section, joined by shorter parts of substantially circular cross section. Such wire can be made by a special rolling process, and the flattened parts can have a ratio of width to thickness of between 1.5 to 1 and 5 to 1. In the special rolling process a start is made with a wire with a maximum diameter of 0.75 mm, which means that in addition to the production of the modified wire expense is incurred through the long series of drawing operations required just to make a wire with a maximum diameter of 0.75 mm. Neither is any improvement achieved regarding crack retardation, and furthermore the wire's cross sectional area is still constant throughout the length of the wire.

For a composite material comprising concrete and a large number of short, straight steel wires to acquire optimal properties, the wires must be distributed as uniformly as possible in the concrete. Since steel wire has a considerably higher density than concrete, there is a certain risk of settling and even of local stacking, especially when vibrators are used to pack the concrete. The above mentioned modified wires fail to give any improvement in this respect.

SUMMARY

The main object of the present invention is to provide a reinforcing material incorporating a multitude of short and substantially straight steel reinforcing elements with substantially rectangular cross section and small thickness in relation to their length and width, and adapted to be uniformly distributed and in principle randomly orientated in the concrete, said reinforcing material, whilst retaining all the good properties of wire-reinforcement, permitting a better utilization of the volumetric proportion of reinforcing elements in the concrete. According to the invention, this object is achieved in that the reinforcing elements are relatively difficult to crush steel flakes of a shape tapering towards the ends of the flake, said flakes having a thickness of about 0.1 mm to about 0.5 mm and a length of at least about 100 times the thickness. A wire-shaped reinforcing element is effective from the crack retardation aspect in its longitudinal direction only, whereas a flake-shaped reinforcing element is effective in all directions within its plane. Additionally, as the cross sectional area of the reinforcing element decreases in a direction towards the unstressed ends of the element the volumetric degree of utilization of the elements increases.

The reinforcing material can be manufactured by causing molten steel, which is of such a composition that rapid cooling of thin layers of the melt produces relatively flexible and relatively difficult to crush films of a certain ductility, to impinge upon at least one relatively cold metal surface with great cooling capacity, moving rapidly substantially across the direction of delivery of the molten steel to form at least one discrete, relatively thin flake-shaped layer of molten steel on the metal surface, and causing the relatively thin layer to solidify on the cold metal surface with great cooling capacity, to form a relatively thin, flexible and difficult to crush steel flake with a relatively rough surface and a shape tapering towards the ends of the flake, and mutually adjusting the parameters which determine the flakes' dimensions so as to give the flakes a thickness of at least about 0.1 mm and at most about 0.5 mm and a length of at least about 100 times the thickness.

To improve still more the degree of utilization of the volumetric content of reinforcing flakes in the concrete, the thickness of the flakes should be at most about 0.2 mm, and the width of the flakes should be at least about ten times the thickness, but at least about 2 mm, and simultaneously at least about one tenth of the length. In a preferred embodiment the maximum width is at most about 15 mm, preferably at most about 8 mm, and expediently between about 4 mm and 6 mm. Additionally it is preferred that the length of the flakes is between about 20 mm and about 80 mm, expediently between 25 mm and 50 mm. In theory, flakes which are relatively short in comparison to their width should be preferable. However, it has proven to be difficult, without special measures, to get a sufficiently strong bonding between such flakes and concrete. Therefore it is advisable to increase the bonding surface by giving the flakes a comparatively elongated shape.

The surface of the metal flakes is preferably relatively rough, to give stronger bonding characteristics in the concrete, but even a smooth flake is bonded more strongly than a smooth wire, because the flake has a considerably greater bonding surface against the concrete than does a circular wire or fibre of the same volume. Even upon a comparison to strip-shaped wires or fibres a greater bonding surface is obtained, because the flakes according to the invention have a greater ratio maximum width to thickness than the known strip-shaped reinforcing elements. Thanks to the above-mentioned casting process the surface will be relatively rough, but a rough surface may also be obtained by mechanical means, e.g. by embossing dies. Of course, the flakes may alternatively or additionally be provided with a layer, known per se, improving the bonding characteristics.

For flakes made by oblique cutting of strip material an asperate or relatively rough surface may be obtained by sandblasting the strips prior to cutting them. A sandblasted surface has a centre line average height (A.A.) of 3.2 to 12.5 $\mu$m or 12.5 to 50 $\mu$m depending on the sand used and the relative area of recesses or pits is about 40 to 60% while the relative area of projections is about 60 to 40%. Generally, the cast flakes have a centre line average height of 25 to 250 $\mu$m.

Additionally, flake-shaped reinforcing elements are not as suspectible to settling as are wire-shaped elements, and any risk of local stacking face to face can be eliminated by using metal flakes twisted into slight propeller shapes. Cast flakes will automatically get such shapes.

Because the flakes can absorb stress in all directions within their planes, it is also fitting that the flakes should have strength properties which are direction-independent. Such properties are obtained, for example, by casting the flakes.

It may also be expedient in certain cases to use flake aggregates as reinforcement, in which at least the main proportion of the flakes are joined together to form the three-dimensional open structure. Such aggregates also facilitate the handling and transportation of the flakes.

Perhaps the greatest advantage of all in using flakes instead of thin short wire as a reinforcing material in concrete lies with the cost, for flakes can be made, for example by the casting process, for a fraction of the cost of the thin wire concerned.

From what has been said above it is clear that a flake-reinforced concrete product will possess properties which are at least as good as, and in most cases even

DESCRIPTION OF THE PREFERRED EMBODIMENTS

Figure 1:
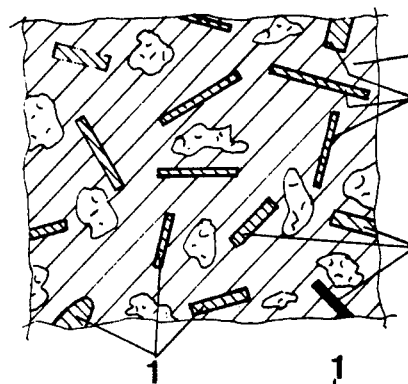
FIG. 1 is part of a cross section through a reinforced concrete product, which contains steel flakes, in accordance with the present invention, as reinforcing material.
Figure 6:
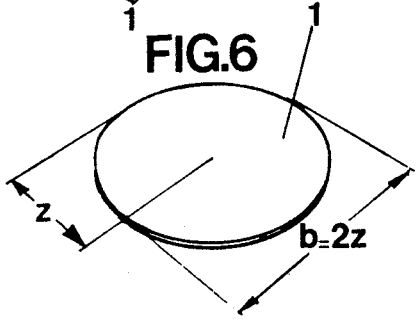
FIG. 6 is a perspective view of a circular steel flake.

The reinforced concrete product shown in FIG. 1 contains as reinforcing material a multitude of steel flakes 1 in principle uniformly distributed an randomly orientated in the concrete 2. The thickness "$t$" of the flakes is small in relation to their length "$2z$", and the width "$b$" is large in relation to the thickness "$t$", as can be seen in FIGS. 2, 3 and 6.

Figure 2:
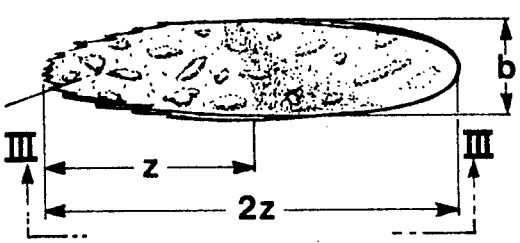
FIG. 2 is a plan view and FIG. 3 a side view of a principally oval steel flake.
Figure 3:

FIG. 2 shows a generally oval steel flake 1, which is relatively elongate and is tapered towards the ends. The flake 1 is widest in the middle and the maximum width "$b$" is at least 10%, expediently at least 20% of the flake's length "$2z$", whilst the flake's thickness "$t$", which depends inter alia on the flake's length, the material in the flake, the friction between flake and concrete and the normal pressure on the flake from the concrete, is usually about 0.8% to about 5% of the flakes's width. The flakes have a thickness of about 0.1 mm to about 0.5 mm, preferably at most about 0.2 mm, and a length of at least about 100 times the thickness. Preferably, the length is at least about 20 mm and at most about 80 mm. The maximum width of the flakes is at least about 10 times the thickness, but at least about 2 mm and at most about 15 mm, preferably at most about 8 mm. In many cases a width of about 4 mm to about 6 mm has proven to be most suitable together with a length of between 25 mm and 50 mm. FIG. 2 also shows that the flake's surface is comparatively rough, which improves friction between flake and concrete, and FIG. 3 shows that the flake is twisted into a slight propeller shape, which prevents stacking of the flakes face to face. One end of the generally oval flake shown in FIG. 2 also has relatively even edges, whilst the other end has relatively uneven edges.

Such flakes can be produced at comparatively low cost by allowing molten steel (if desired, in a vacuum or in protective gas) to run or drip down on to a cooled metal surface moving rapidly across the direction of delivery of the molten steel, for example an internally cooled metal disc rotating in the horizontal plane. The shape and dimensions of the flakes formed depend on inter alia the temperature, droplet size, and vertical drop of the molten metal, the disc's temperature and speed of rotation, as well as on the distance from the disc's centre to the point of impact of the drops. During initial experiments steel flakes were produced with lengths between 20 and 80 mm, widths between 4 and 15 mm, and thicknesses between 0.1 and 0.5 mm, but for reinforcing purposes somewhat smaller dimensions may in certain cases be preferred, if a high utilization of the reinforcing volume is desired. Thanks to the casting process, the material in the flakes gets direction-independent strength properties, and the extremely rapid solidification produces an extremely close-grained or amorphous structure.

Figure 4:
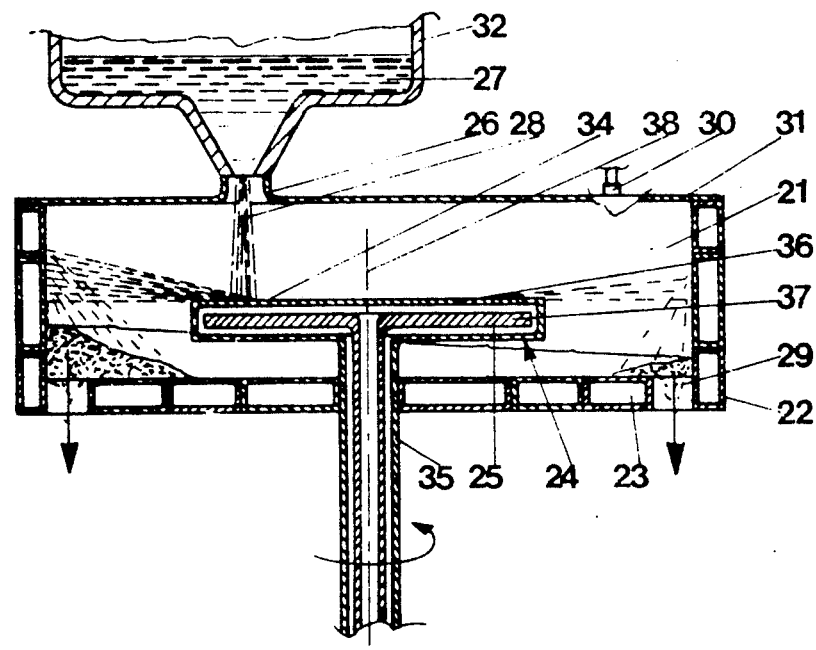
FIG. 4 is a view of a vertical cross section through a diagramatically illustrated embodiment of a device for manufacturing the flakes shown in FIGS. 2 and 3.

The device shown in FIG. 4 for manufacturing steel flakes incorporates a container 21, which in the embodiment shown is cylindrical and has a casing 22 and a bottom 23. Both casing 22 and bottom 23 are water-cooled, although it is not shown how the water cooling itself is produced. The container 21 also has a cover 31 with an inlet orifice 26, to which is connected some kind of casting box 32. The casting box 32 contains molten steel 27 of such a composition that rapid cooling of thin layers of the melt produces relatively flexible, difficult to crush films. A conduit 30 connected to the cover 31 permits the container 21 to be placed under vacuum by means of a vacuum pump which is not shown, and/or to be charged with protective gas from a suitable source which is not shown.

The molten steel 27 from the casting box 32 is made to impinge upon a relatively cold metal surface 34 of great cooling capacity, moving rapidly substantially across the direction of delivery of the molten steel, to form at least one discrete, relatively thin, flake-shaped layer of molten steel on the metal surface 34. In the shown embodiment of the device, the metal surface 34 is the upper side of an internally cooled disc 24 which is fitted under the inlet orifice 26 and can rotate in the container. The disc is mounted on a driving shaft 35 extending out of the container 21. The disc 24 and driving shaft 35 are provided with internal passages 25 for conducting cooling water, and together form a "cold finger" type of cooling unit with an external part 36 and an internal part 37. At least the external part 36 is rotated by a motor, not shown.

The disc 24, which in the embodiment shown in flat, circular and arranged in the horizontal plane, has its axis 38 of rotation displaced sideways in relation to the pouring or tapping stream 28 dropping from the casting box 32, so that the stream 28 impinges on the rotating cooled disc 24 eccentrically. In this way a plurality of spaced, discrete, relatively thin, flake-shaped layers of molten steel form on the cooled metal surface 34, and thanks to the large cooling capacity of the cooled metal surface 34 these thin layers are made to solidify extremely rapidly on the latter, to form relatively thin, flexible and difficult to crush steel flakes of substantially rectangular cross section and a shape tapering towards the ends of the flake; these are thrown out against the water-cooled casing wall 22, and then fed out by means of suitable devices, not shown, through outlet holes 29 provided in the container's bottom 23. Since the flakes are relatively flexible and difficult to crush, the discharge devices will not cause any significant crushing of the flakes.

Thanks to the large cooling capacity of the cooled metal surface 34, solidification takes place extremely rapidly. Within an interval of time, introduced when a drop of molten steel impinges on the cooled metal surface 34 and terminated when the drop, converted into a thin solidified flake, leaves the cooled metal surface or has at least been cooled by the metal surface 34 to a temperature below the point of sticking, the cooling rate is extremely high, i.e. at least about $10^4$ °C/s, preferably at least about $10^5$ °C/s and expediently at least about $10^6$ °C/s.

The dimensions of the flakes produced depend on a number of parameters, of which the most important are the temperature of the melt 27, the casting rate, the vertical drop, and the velocity of the cooled metal surface 34 at the point of impact of the pouring stream 28. These parameters are so mutually adjusted that the steel flakes' thickness will be at least about 0.1 mm and at most about 0.5 mm, preferably at most about 0.2 mm and so that the length will be at least about 100 times the thickness. In the device shown, low r.p.m. of the disc 24 produce relatively thick flakes, and higher r.p.m. thinner flakes. This can be explained by the fact that, when the molten steel impinges upon the cooled metal surface 34, it first solidifies at the interface with the cooled metal surface 34 and is pulled by this through friction into rotation around the axis 38, whereas the molten material lying on top is thrown outwards more easily due to inertia. The solidified flake, which has a comparatively rough surface, does not stick to the cooled metal surface 34, but the material in its entirety is thrown outwards.

It is also expedient for the above-mentioned parameters to be so mutually adjusted that, with reference to FIGS. 2 and 3, the steel flakes' 1 length "$2z$" will be at least about 20 mm and at most about 80 mm, whilst the maximum width "$b$" of the flakes will be at least about ten times their thickness "$t$", but at least about 2 mm and at most about 15 mm, preferably at most about 8 mm. The most advantageous width appears to be between about 4 mm to about 6 mm together with a length of about 25 mm to about 50 mm. Such flakes are easy to make, store and transport, and give a good reinforcing effect in concrete.

During an experiment with the device shown in FIG. 4, the molten metal 27 consisted of low carbon steel at a temperature of 1600° C, the pouring stream had a diameter of about 10 mm, and the vertical drop was 500 mm. The cooled disc 24 had a diameter of 250 mm and rotated at 30 $s^{-1}$, and the pouring steam 28 impinged on the circular disc 24 at about 70 mm from the latter's periphery. This produced relatively flexible, difficult to crush, generally elliptical flakes which looked like those in FIGS. 2 and 3 and had a length "$2z$" of about 70 mm, a width "$b$" of about 12 mm, and a thickness "$t$" of about 0.1 mm.

As to the temperatures, that of the molten metal 27 in the casting box 32 preferably is in the range of 1600° to 1650° C. The inlet temperature of the cooling water passed through the rotating disk 24 varies between about 5° C in wintertime and 15° C in summertime. Presuming batch-wise operation the initial temperature of the cooled metal surface 34 will, thus, be about 10° C as an average. With a diameter of 8 mm of the casting aperature provided in the bottom of the casting box 32, the steel flakes will be produced at a rate of slightly higher than 0.7 kg/s, and the rate of the temperature rise will initially be rather steep. It will take about 14 minutes to produce 600 kg of steel flakes, and then the temperature 0.1 mm below the surface 34 of the disk will be about 900° C. A temperature of 1000° C will be reached after about 34 minutes, but it would take about 108 minutes to reach a maximum permissible temperature of 1100° C. A normal batch of molten steel is about 3 tons and will be processed in about 70 minutes under the above conditions.

To reduce the rate of the temperature rise it is possible to let the pouring stream 28 impinge upon the circular disk 24 at a greater distance from its axis 38 while simultaneously reducing the R.P.M. of the disk to keep the relative speed of the disk at the impingement point unchanged. The relative speed preferably is in the range of about 10 to about 15 m/s.

Another process for making such oval flakes is to convert balls, such as pellets of reduced iron oxide, in a first rolling device to fusiform or ellipsoidal bodies, which are rolled out into oval flakes of the required thickness in a second rolling device.

Figure 5:
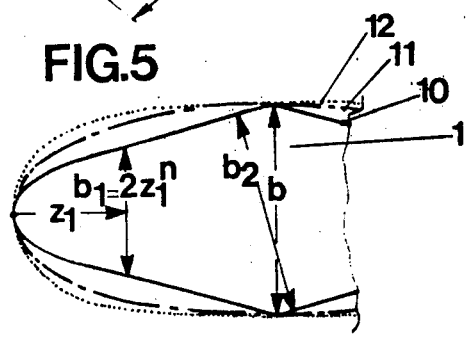
FIG. 5 is a plan view of a mathematical model of a metal flake of the type shown in FIG. 2.

The oval flake shapes produced by casting can for mathematical treatment be approximated to an exponential shape or to an ellipse. With the exponential shape it is assumed that for each half of the flake the width "$b_1$" at a distance "$z_1$" from the end of the flake is determined by the equation: $b_1 = 2z_1^2$, where $1 > n > 0$. In FIG. 5 the symbol 10 is used for a flake with $n = 0.5$, and 11 for a flake with $n = 0.33$, whilst 12 is the symbol for an ellipse. FIG. 5 also shows that, for the exponential shape, the flake's maximum width "$b$", measured at right angles to its longitudinal axis, is greater than a width "$b_2$" measured between opposite sides through the centre of the flake and inclined to the longitudinal axis. For small n-values the difference between "$b$" and "$b_2$" can be ignored. For higher n-values, the following relations apply:

| n | 0.5 | 0.6 | 0.7 | 0.8 | 0.9 | 1.0 |
|---|---|---|---|---|---|---|
| $b/b_2$ | 1.01 | 1.03 | 1.07 | 1.13 | 1.21 | 1.41 |

When dimensioning randomly orientated flakes of exponential shape and high n-values, the fact that "$b_2$" gives a weaker cross section, i.e. smaller cross sectional area, than "$b$", has to be taken into consideration.

Elliptical flakes do not give rise to equivalent problems, provided that the width "$b$" is measured at right angles to the ellipse's major axis, i.e. the width equals the ellipse's minor axis. If the major and minor axes of an ellipse are the same size, the flake 1 is circular with the radius "$z$" as shown in FIG. 6. Circular flakes can be produced, e.g. by flattening balls, such as reduced iron oxide pellets, to a suitable thickness.

Figure 7:
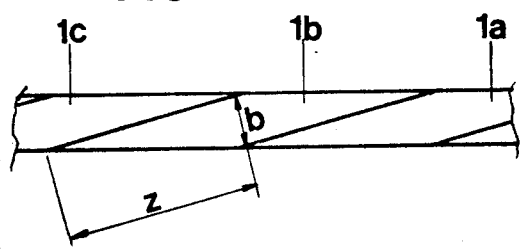
FIG. 7 is a plan view of a strip being cut into rhombic flakes.

FIG. 7 illustrates manufacturing of rhombic flakes (1a, 1b, and 1c) by oblique cutting of a strip of desired thickness and width. Preferred thicknesses are about 0.1 to about 0.2 mm, whilst the preferred maximum widths are between about 2 and about 6 mm, and the preferred lengths are about five to about ten times the maximum width.

In order to illustrate the flake's superiority over wire as a reinforcing element, reference is made to Table 1. The following assumptions apply:

The force ($F_{trans.}$) which the element must transmit to the concrete in a reinforced concrete product stressed in tension amounts to 10 kN. The allowable tensile stress ($\sigma_{tn}$) in the element is 500 N/mm². It is also assumed that the product $\mu \cdot N$ is 5 N/mm², where $\mu$ is the friction between element and concrete and N is the normal pressure on the element from the concrete. No account has thus been taken of the fact that the flake's surface is preferably relatively rough, to give better friction. A flake with a rough surface will therefore produce even better values than those quoted in Table 1. It is also assumed that the element's length is optimal, i.e. the element breaks at the same moment as the shear stresses become so great that slippage between the element and the concrete occurs.

Table 1 is divided vertically into three sections. For the upper section the further assumption is made that all types of elements have the same half-length, namely $z = 10$ mm. In the middle section it is assumed instead that the same number of elements of each type is used ($x = 25$ elements), and that therefore all elements absorb equally great stress, namely $F = 400$ N/element. In the lower section of the table the further assumption is made instead that each element, irrespective of type, has a half-volume of 4 mm$^3$.

Figure 8:
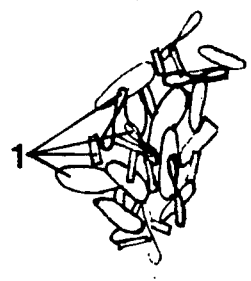
FIG. 8 is a perspective view of a part of an aggregate formed of mutually joined flakes.

In order to facilitate transportation of flakes in bulk, these can if desired be joined together to form a three-dimensional, open structure; see FIG. 8. Such an aggregate of flakes uniformly distributed and randomly orientated in space is easy to transport from the maker to the customer who can then charge the aggregate with unhardened relatively easy flowing concrete, perhaps with the aid of vibrator, for the manufacture of a reinforced concrete product. It is naturally also possible, and in general to be preferred, to transport loose flakes in bulk and then mix these into the unhardened concrete in the conventional manner.

To make an unhardened concrete or mortar mixture with admixed flakes it is preferred first to mix predetermined amounts of flakes, cement, sand, and possible aggregate, and then to add a predetermined amoumt of water. The volumetric percentage of flakes required will vary according to the requirements of the hardened concrete. In most applications it is likely to be within the range 0.5% to 4%.

What is claimed is:

1. A reinforcing material for concrete said material being a multitude of short and substantially straight steel reinforcing elements of substantially rectangular cross section and small thickness in relation to their length and width, intended to be uniformly distributed and randomly orientated in the concrete, characterized in that the elements are relatively difficult to crush steel flakes with a shape tapering towards the ends of the flakes, said flakes having a thickness of from about 0.1 mm to about 0.5 mm and a length of at least about 100 times the thickness.

2. A reinforcing material according to claim 1, characterized in that the thickness is at most about 0.2 mm.

3. A reinforcing material according to claim 1, characterized in that the steel flakes have a maximum width of at least about ten times the thickness, but at least about 2 mm, said maximum width being at least about one tenth of the length.

4. A reinforcing material according to claim 3, characterized in that the maximum width is at most about 15 mm, preferably at most about 8 mm.

5. A reinforcing material according to claim 4, characterized in that the maximum width is at least about 4 mm and at most about 6 mm.

6. A reinforcing material according to claim 1, characterized in that the length of the steel flakes is at least about 20 mm and at most about 80 mm.

7. A reinforcing material according to claim 1, characterized in that the surface of the steel flakes is relatively rough.

8. A reinforcing material according to claim 1, characterized in that the steel flakes are twisted into a slight propeller shape.

Table 1

| Type of reinforcing element | Thickness (or radius) t (or r) mm | Width b mm | Reinf. element's half-length z mm | Loading per element F N | No. of elements No. | Sum of half-volumes V mm$^3$ | Volumetric utilisation degree $F_{trans.}$ |
|---|---|---|---|---|---|---|---|
| Wire | 0.2 | — | 10 | 62.8 | 159.2 | 200 | 5.0 |
| Short strip | 0.2 | 10 | 10 | 1000 | 10 | 200 | 5.0 |
| Exponential shape b=2z$^n$, n=0.5 | 0.133 | 6.3 | 10 | 421 | 23.8 | 133.3 | 7.50 |
| Ellipse | 0.157 | 10 | 10 | 785 | 12.7 | 157 | 6.37 |
| " (b=2z, circle) | 0.157 | 20 | 10 | 1570 | 6.4 | 157 | 6.37 |
| Wire | 0.505 | — | 25.2 | 400 | 25 | 504.6 | 1.98 |
| Short strip | 0.16 | 5 | 8 | 400 | 25 | 160 | 6.25 |
| Exponential shape b=2z$^n$, n=0.5 | 0.129 | 6.2 | 9.7 | 400 | 25 | 128.5 | 7.8 |
| Ellipse | 0.134 | 6 | 8.5 | 400 | 25 | 133.5 | 7.5 |
| Ellipse | 0.10 | 8 | 6.3 | 400 | 25 | 100.0 | 10.0 |
| " (b=2z, circle) | 0.079 | 10.1 | 5 | 400 | 25 | 79.3 | 12.6 |
| Wire | 0.294 | — | 14.7 | 135.5 | 74 | 294 | 3.4 |
| Short strip | 0.14 | 4.1 | 7 | 286 | 35 | 140 | 7.14 |
| Exponential shape b=2z$^n$, n=0.5 | 0.116 | 5.9 | 8.7 | 343 | 29 | 116.2 | 8.6 |
| Ellipse | 0.11 | 6.6 | 7.0 | 364 | 27.5 | 110 | 9.08 |
| " | 0.10 | 8 | 6.3 | 400 | 25 | 100 | 10 |
| " b=2z, circle) | 0.086 | 10.9 | 5.5 | 480 | 20.8 | 86 | 11.6 |

The aggregate of flakes uniformly distributed and randomly orientated in space can be produced in several ways. For example, the flakes can be charged into a mould and the charged mould heated, expediently in a protective gas atmosphere, to a temperature at which the flakes become "tacky" and stick together at their points of contact. Another method is to form a thin oxide layer on the flakes' surfaces and to wet the oxide layer with an acid, e.g. phosphoric acid, which reacts with the acid and thereby binds the flakes together. The strength of the aggregate made in this way is considerably improved if the aggregate is subjected to reduction, e.g. in an hydrogen gas furnace, for converting to metallic iron the iron compounds acting as binders. The resulting aggregate is very stable and capable of absorbing very high stresses.

9. A reinforcing material according to claim 1 characterized in that the material in the steel flakes has direction-independent strength properties.

10. A reinforcing material according to claim 1, characterized in that at least a major proportion of the steel flakes are joined together to form a three-dimensional, open structure.

11. A pourable concrete mix, comprising the reinforcing material as claimed in claim 1, in sufficient quantities to produce a reinforced concrete product upon hardening of the concrete.

12. A reinforced concrete product, comprising the reinforcing material as claimed in claim 1 uniformly distributed and randomly orientated therein.

* * * * *

UNITED STATES PATENT AND TRADEMARK OFFICE
CERTIFICATE OF CORRECTION

PATENT NO. : 4,050,949
DATED : September 27, 1977
INVENTOR(S) : Bengt G.S. Lundgren It is certified that error appears in the above-identified patent and that said Letters Patent are hereby corrected as shown below:

Column 1, line 31 delete "(an equal sign)" and insert --=--.

Column 1, line 36 change "reinforcngg" to read --reinforcing--.

Column 2, line 2 after "unreinforced concrete" insert --,--.

Column 6, line 42 change "in" (second occurrence) to read --is--.

Column 8, line 18 change "$2z_1^2$" to read --$2z_1^n$--.

Column 9, line 20 change "vibrator" to read --vibrators--.

Column 10, line 2 change "amoumt" to read --amount--.

In the table, the last title, change "F trans." to --$F_{trans.}/V$--.

Signed and Sealed this

Twenty-fourth Day of January 1978

[SEAL]

Attest:

RUTH C. MASON
Attesting Officer

LUTRELLE F. PARKER
Acting Commissioner of Patents and Trademark